Patented Oct. 28, 1947

2,429,883

UNITED STATES PATENT OFFICE 2,429,883

ALKYL-DIALKYLAMINOSILANES

Oscar Kenneth Johannson, Corning, N. Y., assignor to Corning Glass Works, Corning, N. Y., a corporation of New York No Drawing. Application May 16, 1946, Serial No. 670,294

6 Claims. (Cl. 260—583)

This invention concerns a new class of organosilicon amines in which the silicon is linked to the nitrogen and the remaining valences of the nitrogen are linked to alkyl groups. It pertains especially to organosilicon compositions which have the general formula $R_nSi(NR'_2)_{4-n}$ wherein each R represents an alkyl radical and each R' represents an alkyl radical and $n$ is an integer less than 4.

The organosilicon compounds which have the above general formula are many of them liquids and are readily hydrolyzable with water. Upon hydrolysis, hydroxyl radicals are substituted on the silicon for the dialkylamino groups. The hydrolyzate may then condense with the production of a siloxane, depending upon the reactivity of the silanol which is produced. This condensation reaction is a function of the number and character of organo substitutents linked to the silicon.

The organosilicon compounds of this invention are useful for such purposes as water-proofing. The organosilicon halides have heretofore been proposed as hydrophobing agents. Since the halides are distinctly acid, the physical properties of the material being water proofed or made water repellent are degenerated in many cases by their use. The present compounds are of particular utility for hydrophobing of such materials, since upon hydrolysis dialkyl amine and the relatively neutral silicones are liberated.

The compounds hereof are readily producible by reacting the corresponding organosilicon halide with a dialkyl amine. The hydrogen chloride which is produced in this reaction reacts with the amine to form a hydrochloride. Accordingly 2 mols of the amine are necessary for complete reaction unless other means are employed to neutralize the hydrogen chloride. It should be noted that the reaction should be carried out under anhydrous conditions to avoid formation of siloxane.

The alkyl substituents which are linked to the silicon by carbon to silicon bonds may be either lower alkyl groups, as for example, methyl or ethyl, or they may be higher alkyl, such as octadecyl. The length of the alkyl groups linked to the nitrogen may vary. However, it is preferred that these alkyl groups contain less than 4 carbon atoms each. Ethyl radicals are preferred due to the commercial availability of diethylamine.

The following examples illustrate various compounds in accordance with the invention but should not be construed as limiting the scope hereof.

Example 1

The compound $(C_2H_5)_3SiN(C_2H_5)_2$ was prepared as follows:

A solution of 10 g. of triethyl silicon chloride in 25 ml. of diethyl ether was added by drops to 10.3 g. of diethyl amine in 25 ml. of diethyl ether at room temperature. As soon as the addition began, a white crystalline precipitate was formed. After all the chloride was added, the crystalline material was separated from the solution. There was obtained 6.9 g. of the crystalline material. The theoretical yield of diethyl amine hydrochloride is 7.2 g. On removing diethyl ether from the filtrate, 10 g. of liquid was obtained, as against a theoretical yield of 12.4 g. of the product being prepared. The liquid was fractionated. The main product was found to boil at 85–86° C. at 12 mm. Upon analysis, this fraction was found to contain silicon in amount equivalent to 32.03% $SiO_2$ (theory for the compound being prepared is 32.05% $SiO_2$).

Example 2

The compound $(C_2H_5)_2Si(N(C_2H_5)_2)_2$ was prepared as follows:

A slight excess over two mols of diethylamine was added to a benzene solution of one mol of diethyldichlorsilane. The diethylamine hydrochloride was filtered off and the filtrate was distilled. Two fractions were obtained. The first fraction by analysis was shown to be $$(C_2H_5)_2SiClN(C_2H_5)_2.$$

The second fraction was the desired diethylbisdiethylaminosilane, and had the properties and analysis shown.

|  | Found | Theoretical |
|---|---|---|
| Boiling Point | 140–142° C. at 50 mm | |
| Sp. G. 20/4 | 0.853 | |
| Ref. Index 20 | 1.4485 | |
| Per cent C | 62.20 | 62.6 |
| Per cent Si | 10.10 | 12.2 |
| Per cent N | 10.92 | 12.2 |
| Per cent Cl (Hydrolyzable) | 0.1 | 0.0 |

Example 3

The compound $C_{18}H_{37}Si(N(C_2H_5)_2)_3$  was prepared by the same method employed in Example 2, using octadecyl silicon trichloride as the reagent. In this case, no initial chloride fraction was obtained from the filtrate. The following properties and analysis were found:

|  | Found | Theoretical |
|---|---|---|
| Boiling Point | 211–216° C. at 0.16–0.30 mm. | |
| Per cent C | 67.15 | 72.5 |
| Per cent Si | 5.68 | 5.6 |
| Per cent N | 6.15 | 8.5 |

Example 4

The compounds $CH_3Si(N(C_2H_5)_2)_3$ and $(CH_3)_2Si(N(C_2H_5)_2)_2$ were prepared by the method described in Example 2, from a mixture of methyl silicon trichloride and dimethyl silicon dichloride. A reaction mixture was obtained from which the diethylamine hydrochloride was separated. This reaction mixture was a valuable material for making paper and cotton fabrics water repellent, though the two compounds could not be separately isolated therefrom.

I claim:

1. An organosilicon amine having the general formula:

$$R_nSi(NR'_2)_{4-n}$$

in which each R represents an alkyl radical, each R' represents an alkyl radical, and $n$ represents an integer less than 4.

2. An organosilicon amine having the general formula:

$$R_nSi(NR'_2)_{4-n}$$

in which each R represents an alkyl radical containing from 1 to 18 carbon atoms, each R' represents an alkyl radical, and $n$ represents an integer less than 4.

3. An organosilicon amine having the general formula:

$$R_nSi(NR'_2)_{4-n}$$

in which each R represents an alkyl radical containing from 1 to 18 carbon atoms, R' represents an ethyl radical and $n$ represents an integer less than 4.

4. $C_{18}H_{37}Si(N(C_2H_5)_2)_3$.
5. $(C_2H_5)_2Si(N(C_2H_5)_2)_2$.
6. $(C_2H_5)_3SiN(C_2H_5)_2$.

OSCAR KENNETH JOHANNSON.